(12) United States Patent
Bullard et al.

(10) Patent No.: US 9,296,496 B2
(45) Date of Patent: Mar. 29, 2016

(54) THERMAL MANAGEMENT SYSTEM AND METHOD FOR SPACE AND AIR-BORNE SENSORS

(71) Applicant: Raytheon Company, Waltham, MA (US)

(72) Inventors: Andrew L. Bullard, Manhattan Beach, CA (US); David M. La Komski, Long Beach, CA (US)

(73) Assignee: Raytheon Company, Waltham, MA (US)

( * ) Notice: Subject to any disclaimer, the term of this patent is extended or adjusted under 35 U.S.C. 154(b) by 140 days.

(21) Appl. No.: 13/784,451

(22) Filed: Mar. 4, 2013

(65) Prior Publication Data

US 2014/0246544 A1 Sep. 4, 2014

(51) Int. Cl.
*B64G 1/50* (2006.01)
*G01D 11/24* (2006.01)

(52) U.S. Cl.
CPC ................ *B64G 1/50* (2013.01); *G01D 11/245* (2013.01)

(58) Field of Classification Search
CPC .......... B64G 1/50; B64G 1/506; B64G 1/503; B64G 1/36
USPC ............................................... 244/164, 171.8
See application file for complete search history.

(56) References Cited

U.S. PATENT DOCUMENTS

| | | | |
|---|---|---|---|
| 3,899,674 A * | 8/1975 | Decramer et al. | 250/352 |
| 4,030,316 A * | 6/1977 | Aronson | 62/467 |
| 4,133,376 A * | 1/1979 | Eilenberg | F17C 13/001 165/104.21 |
| 4,880,050 A | 11/1989 | Nakamura et al. | |
| 5,259,577 A * | 11/1993 | Achkar et al. | 244/164 |
| 5,931,418 A * | 8/1999 | Eller et al. | 244/171.8 |
| 6,080,962 A | 6/2000 | Lee | |
| 6,883,588 B1 * | 4/2005 | Low et al. | 165/41 |
| 7,069,975 B1 * | 7/2006 | Haws | B64G 1/50 165/10 |

(Continued)

FOREIGN PATENT DOCUMENTS

JP 61198980 A * 9/1986

OTHER PUBLICATIONS

Goes-R Abi Instrument p. http://www.goes-r.gov/spacesegment/abi.html Archived by Internet Archive on Aug. 11, 2011, http://web.archive.org/web/20110811234459/http://www.goesr.gov/spacesegment/abi.html, accessed Mar. 6, 2015.*
Wielicki, Bruce A., et al. "Clouds and the Earth's Radiant Energy System (CERES): An earth observing system experiment." Bulletin of the American Meteorological Society 77.5 (1996): 853-868.*

(Continued)

*Primary Examiner* — Tien Dinh
*Assistant Examiner* — Alexander V Giczy (57) ABSTRACT

According to one embodiment, an apparatus includes an optical sensor having one or more thermally sensitive components. The sensor is gimbal mounted on a space or air-borne vehicle and includes a heat sink component thermally coupled to the one or more thermally sensitive components via at least one heat strap and configured to at least passively receive and store thermal energy from the one or more thermally sensitive components without use of a motorized thermal energy transfer device. The apparatus also includes a radiator configured to receive thermal energy from the heat sink component and to dissipate thermal energy to an ambient environment. The radiator is disposed on a first side of an optical path of the sensor opposite a second side of the optical path on which the heat sink component is disposed. The heat sink component is configured to at least partially balance a center-of-gravity of the sensor.

20 Claims, 4 Drawing Sheets

(56) References Cited

U.S. PATENT DOCUMENTS

| | | | |
|---|---|---|---|
| 7,270,302 B1* | 9/2007 | Wong et al. | 244/171.8 |
| 7,487,016 B2* | 2/2009 | Fowell et al. | 701/13 |
| 7,708,053 B2* | 5/2010 | Kroliczek et al. | 165/104.21 |
| 7,762,499 B1 | 7/2010 | Hentosh et al. | |
| 7,841,382 B2* | 11/2010 | Korpan et al. | 165/41 |
| 8,123,173 B1* | 2/2012 | Goodzeit et al. | 244/164 |
| 8,676,503 B2* | 3/2014 | Johnson | 701/500 |
| 2003/0121639 A1* | 7/2003 | Nomura | 165/41 |
| 2004/0232284 A1* | 11/2004 | Tjiptahardja et al. | 244/163 |
| 2009/0184798 A1* | 7/2009 | Vaidyanathan et al. | 337/298 |
| 2009/0218447 A1* | 9/2009 | von Flotow et al. | 244/131 |
| 2009/0288801 A1* | 11/2009 | Figus | 165/47 |
| 2011/0001013 A1* | 1/2011 | Torres Sepulveda et al. | 244/171.8 |
| 2012/0217348 A1* | 8/2012 | Aguirre Martinez | B64G 1/1021 244/158.5 |
| 2013/0000881 A1 | 1/2013 | Lavoie et al. | |
| 2013/0068891 A1* | 3/2013 | Hugon et al. | 244/171.8 |

OTHER PUBLICATIONS

Donabedian, Martin. (2003). Spacecraft Thermal Control Handbook, vol. 2—Cryogenics. American Institute of Aeronautics and Astronautics/Aerospace Press. Online version available at: http://app.knovel.com/hotlink/toc/id:kpSTCHVC01/spacecraft-thermal-control/spacecraft-thermal-control; accessed Sep. 9, 2015.*

Gilmore, David G. (2002). Spacecraft Thermal Control Handbook, vol. 1—Fundamental Technologies (2nd Edition). American Institute of Aeronautics and Astronautics/Aerospace Press. Online version available at: http://app.knovel.com/hotlink/toc/id:kpSTCHVFT2/spacecraft-thermal-control-2/spacecraft-thermal-control-2; accessed Sep. 9, 2015.*

International Search Report dated Jul. 31, 2014 in connection with International Patent Application No. PCT/US2013/071878, 4 pages.

Written Opinion of the International Searching Authority dated Jul. 31, 2014 in connection with International Patent Application No. PCT/US2013/071878, 6 pages.

* cited by examiner

THERMAL MANAGEMENT SYSTEM AND METHOD FOR SPACE AND AIR-BORNE SENSORS

TECHNICAL FIELD

This disclosure relates generally to thermal management systems, and more particularly, to a thermal management system and method for space and air-borne sensors.

BACKGROUND

A variety of different types of sensors exist to gather information about objects. Non-limiting example of sensors include electro-optical sensing, image sensing, sensing, or many other types of sensing. These sensors have been placed on stationary systems and on moveable platforms such as aircraft, ground vehicles, and sea going vessels. Additionally, sensors have also been deployed on satellites that orbit the Earth.

SUMMARY

This disclosure provides an apparatus and method for thermal management of space and air-borne sensors.

According to one embodiment, an apparatus includes a sensor having one or more thermally sensitive components. The sensor is gimbal mounted on a space or air-borne vehicle and includes a component. The component is configured to at least partially adjust a center-of-gravity of the sensor and to at least partially receive and store thermal energy from the one or more thermally sensitive components. The Apparatus also includes a radiator configured to dissipate thermal energy to the ambient environment. The component is thermally coupled between the radiator and the one or more other thermally sensitive components. The radiator is configured to receive thermal energy from the component.

Certain embodiments may provide various technical advantages depending on the implementation. For example, certain embodiments of the thermal management system may provide reduced weight and costs relative to conventional thermal management systems that thermally manage sensors, such as infrared systems. To maintain temperatures required by currently used infrared systems, conventional thermal management techniques have involved active cooling systems, such as heat pumps that use a motor to pump refrigerant. In addition to requiring the use of electrical power, these active cooling devices also generate unwanted vibration and add additional weight to the platform on which they are mounted. Certain embodiments of the present invention may provide a thermal management system that passively moves thermal energy away from critical components of the sensor in a manner that does not encounter these drawbacks of conventional thermal management systems, while still permitting the gimbaled sensor to point in whatever direction is necessary to perform its mission, regardless of thermal loads on the radiator.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1A through 3, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device(s) or system(s).

As mentioned previously, sensing systems may include numerous different types of sensors, such as those in cameras that acquire imagery using visible or infrared light, and scanning systems that acquire imagery using radiation, such as sonar or electro-magnetic energy. In many cases, imagery acquired from platforms, such as satellites, may be desirable due to its ability to provide imagery over a relatively large geographic area in a relatively short period of time.

One particular problem encountered with sensing systems configured on satellite platforms is thermal control of the various thermally sensitive components of the system. For example, due to lack of an atmosphere, the surface of the satellite facing a warm body such as the Sun, Moon, or Earth may become relatively hot while the other surfaces of the satellite that do not face any warm bodies may become relatively cold. Furthermore, it may be beneficial to provide a thermal storage element, such as a heat sink, that can be used to reduce thermal transients caused by temporary alignment of certain surfaces toward or away from these warm bodies. Nevertheless, thermal storage elements capable of storing sufficient thermal energy are typically large in mass, thus adding additional undesired weight to the satellite.

Figure 1A:
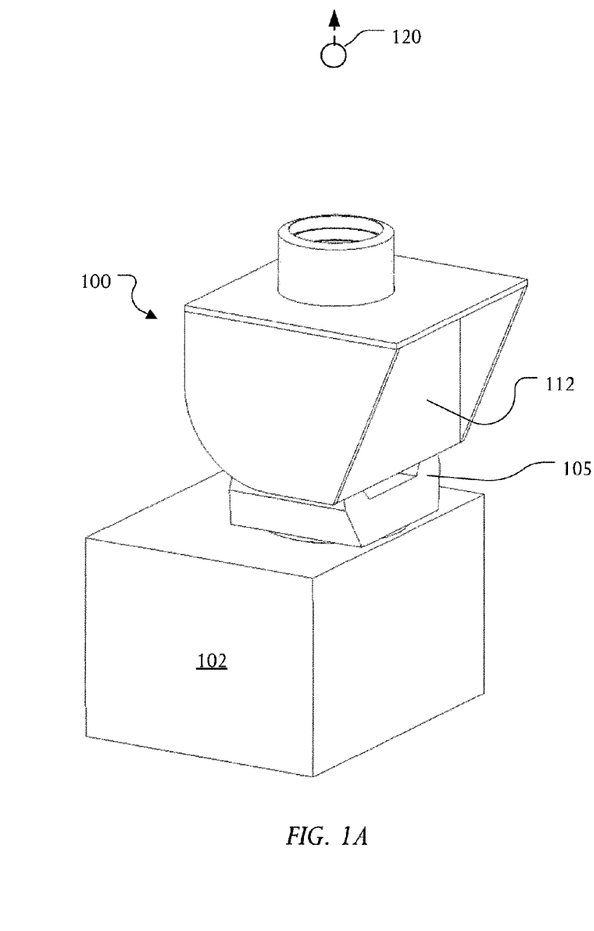
FIGS. 1A-1D illustrate through several views an example sensor on which a thermal management system may be configured according to the teachings of the present disclosure.
Figure 1B:
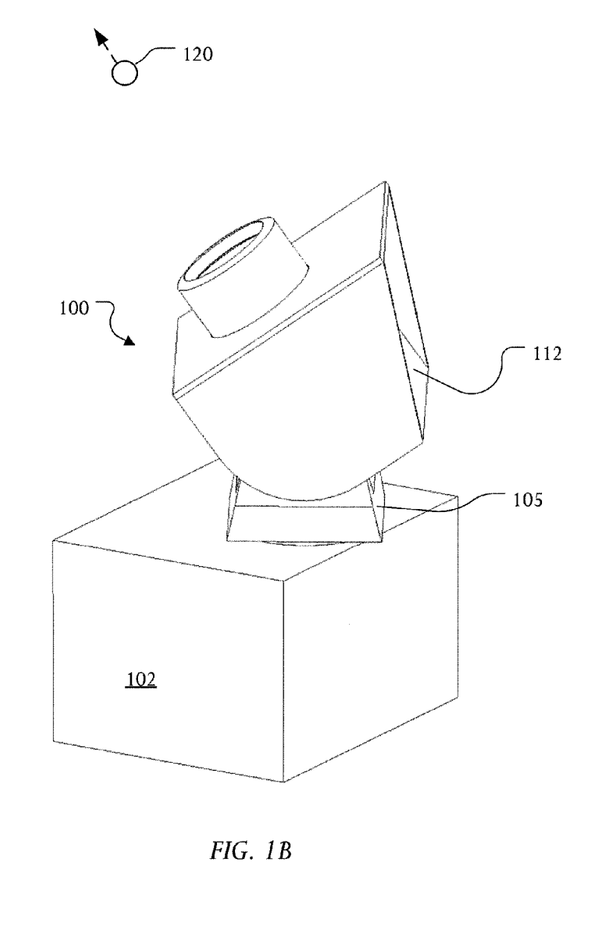
Figure 1C:
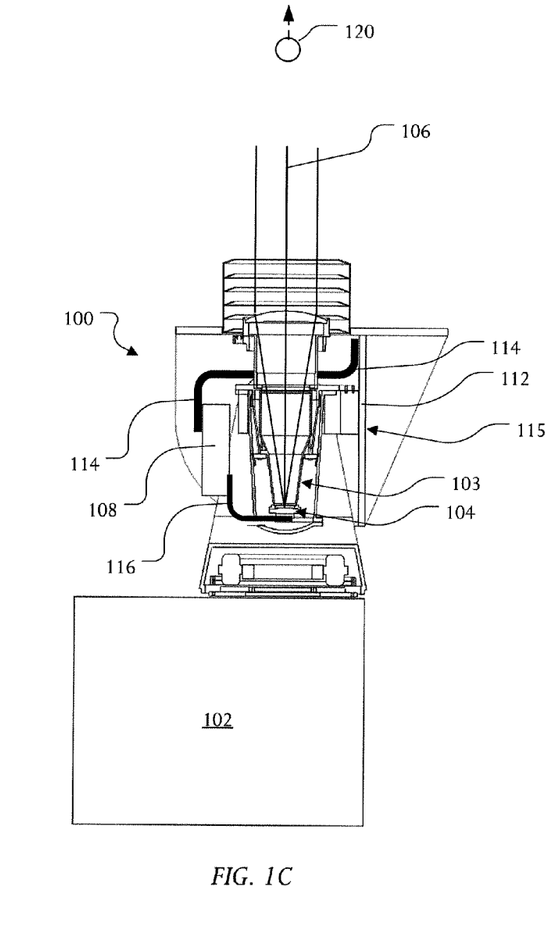
Figure 1D:
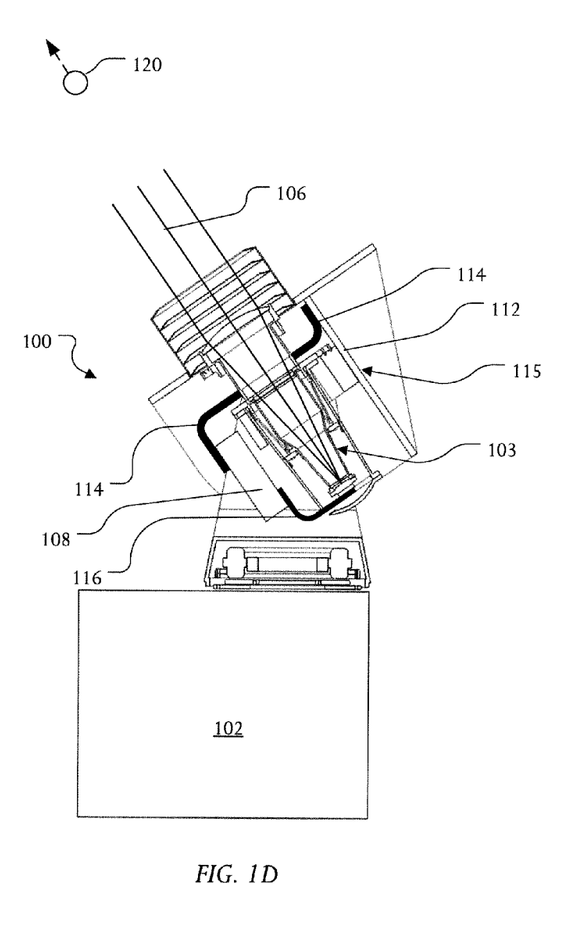

FIGS. 1A-1D illustrate through several views an example sensor 100 on which a thermal management system may be configured according to the teachings of the present disclosure. More specifically, FIG. 1A-1D show perspective and cross-sectional view of a sensor 100 mounted to a space- or airborne vehicle 102. Additionally, FIGS. 1A and 1C show the sensor 100 in a standby or cool-down state whereas FIGS. 1B and 1D shows the sensor 100 in a sensing state (e.g., due to an object of interest that the sensor is sensing).

As a non-limiting example operation, a radiator 112 in FIG. 1A may be pointing away from any thermal-energy generating sources such as earth or the sun (e.g., if the sensor is in space). However, when sensing as shown in FIG. 1B, the radiator 112 may not necessarily be directly pointing away from such thermal-energy generating sources.

In the particular embodiment shown, the sensor 100 includes an infrared system that may be gimbal mounted on the space or air-borne vehicle 102. In particular embodiments, the thermal management system may be implemented on any suitable platform for which thermal management of one or more sensors is desired. For example, the thermal management system may be configured on a visible light sensor that, in turn, is gimbal mounted on a larger structure, such as a spaceship, a high altitude unmanned aerial vehicle (UAV), or other larger satellite structure.

The infrared system includes an optical sensing element 104, which processes an incoming light path 106, and thermally sensitive components 103. The sensor 100 also includes a component 108. In particular configurations, the component 108 may provide a dual purpose of providing or assisting the providing a center-of-gravity adjustment for the gimbal 105 (or sensor) as well as providing a heat sink for thermally sensitive components 103 of the sensor 100.

In particular configurations, the component 108 may be considered a counter-balance weight that, in addition to providing a center of gravity adjustment, also provides a thermal capacitance for thermal energy. In other configurations, the component 108 may be considered a thermal storage unit that, in addition to providing a thermal capacitance for thermal energy, also provides a center of gravity adjustment.

In certain configurations, the component 108 may provide a portion of the center of gravity adjustment or a portion of the thermal capacitance. In such configurations, other components such as a counter-balance weight or a thermal storage unit may provide the remainder of the center of gravity adjustment or the thermal capacitance.

The component 108 may be made of any of a variety of materials or utilize any of a variety of technologies that enable the dual purposes described herein. As a non-limiting examples, the component 108 may include magnesium or a phase change material. Yet other technologies and materials will become apparent to readers of this disclosure.

According to embodiments of the present disclosure, the thermal management system includes a radiator 112 that is thermally coupled to the component 108 via a one-way heat transfer device 114. The radiator 112, when facing away from warm bodies, such as the Sun, Moon, or Earth (e.g., as shown in FIGS. 1A and 1C) dissipates thermal energy from the component 108 such it may be used for cooling of thermally sensitive components 103 of the sensor 100. That is, the component 108 may be used for balancing the physical structure of the sensor 100 as well as for providing a thermal heat sink for managing the temperature of the infrared system. The component 108 may be thermally coupled to the thermally sensitive components 103 of the sensor 100 using one or more heat straps 116 or other suitable heat movement mechanisms.

Certain embodiments of the present disclosure may provide an advantage in that temperatures desirable for infrared sensor may be maintained using a passive (i.e., non-motorized) system that is simple to design and maintain. In many cases, the quality of imagery produced by infrared systems is largely dependent upon the temperature levels that can be maintained by their thermally sensitive components 103. For example, certain components 103 of currently implemented sensors 104, such as infrared systems often depend upon temperature levels in the cryogenic range (e.g., below −239 degrees Fahrenheit). To maintain these relatively cold temperatures, conventional cooling techniques for these infrared systems have either used active cooling systems (such as motor-driven heat pumps that forcibly move thermal energy away from thermally sensitive components 103 of the sensor 100) or passive cooling systems that have prohibitive constrains. The operation of these devices often induces vibration energy into the system that reduces the quality of the sensing. The thermal management system, according to certain embodiments described herein, may provide a solution to this problem by cooling certain components 103 of the thermal system using passive components that induce relatively little unwanted vibration energy. The end result, according to particular embodiments, may be power and monetary savings.

The radiator 112 may include any type that dissipates thermal energy from the component 108 to the ambient environment. In certain embodiments, the radiator 112 comprises a cryoradiator that is designed to dissipate thermal energy at cryogenic temperatures. In the configuration of FIGS. 1A-1D, the radiator 112 is positioned on the sensor 100 such that its front surface 115 faces an orthogonal direction as the optical path 106 of the infrared system. However, in other configurations, the radiator 112 may be positioned in different orientations with respect to the sensor 100.

The one-way heat transfer device 114 conveys thermal energy from the component 108 to the radiator 112. For example, when the radiator is facing away from any warm bodies 120 as shown in FIGS. 1A and 1C, the one-way heat transfer device 114 conveys thermal energy from the component 108 to the radiator 112, and when the radiator is facing toward a warm body 120 as shown in FIGS. 1B and 1D, the one-way heat transfer device 114 conveys little or no thermal energy from the radiator 112 back to the component 108.

In certain embodiments, the one-way heat transfer device 114 is a diode heat pipe that conveys thermal energy at least mostly in only one direction. This one-way heat conveyance design may be provided by a wick encapsulated inside the one-way heat transfer device 114 that moves a multi-phase refrigerant inside the heat pipe in mostly only one direction. Additionally, the wick may provide thermal energy movement regardless of any specific orientation of the sensor 100.

In other embodiments, the one-way heat transfer device 114 may be a thermal switch. As a non-limiting example, the thermal switch may be accomplished by configuring a sleeve and a rod with different coefficients of thermal expansion (CTEs), like aluminum and beryllium where the material having the greater CTE is used on the sleeve such that it only makes contact with the rod below a certain temperature, hence opening the circuit at warmer temperatures. Yet other configurations may also be used as the one-way heat transfer device 114.

In certain embodiments, the component 108 may be thermally insulated to reduce parasitic heat loads For example, a thermal blanket may be wrapped around the component 108 in a manner such that heat is easily conveyed to the one-way heat transfer device 114 and from the heat straps 116 while being thermally insulated from other non-thermally managed components of the sensor 100 or satellite on which it is mounted.

Although FIGS. 1A-1D illustrate one example of a thermal management system, various changes may be made to FIGS. 1A-1D. For example, the optical sensing element 104 may include any type and/or number of elements. As another example, the thermal management system may be adapted to manage the thermal energy of both an infrared sensor and a visible light sensor. As yet another example, the thermal management system may be adapted to manage the thermal energy of multiple infrared sensors. Also, the thermal management system may incorporate any suitable physical structure of the sensor 100 that is capable of thermal storage for use as a heat sink.

Figure 2:
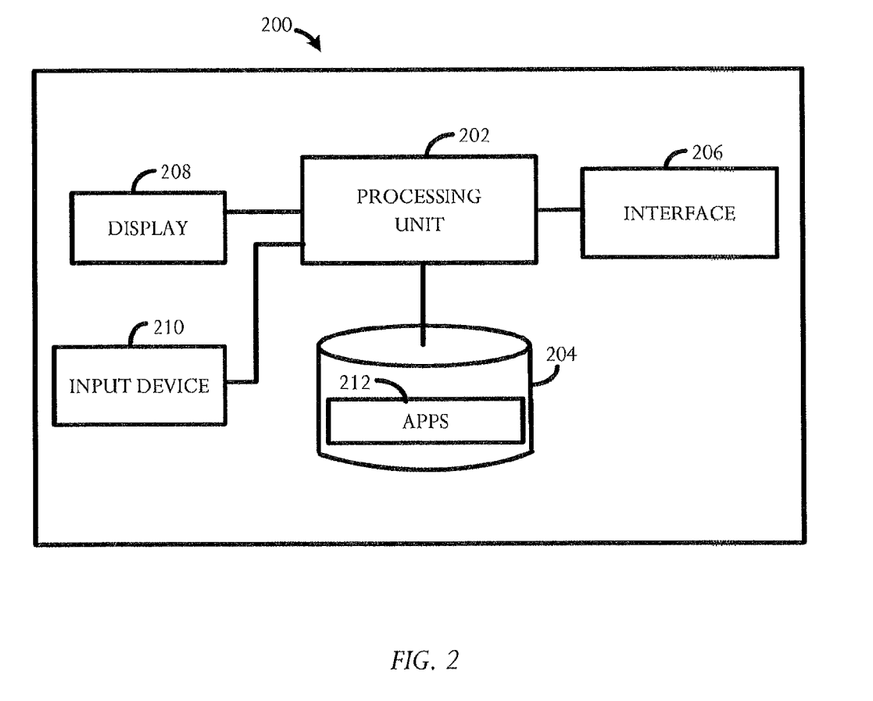
FIG. 2 illustrates an example controller that may be used for controlling the operation of the thermal management system according to this disclosure.

FIG. 2 illustrates an example controller 200 that may be used for controlling the operation of the thermal management system according to this disclosure. Although specific details and components will be shown for a particular controller, in other configurations, the controller may have more, less, or different components. As shown in FIG. 2, the controller 200 includes at least one processing unit 202, at least one memory unit 204, and an interface 206, In certain embodiments, the controller 200 may also include a display 208, and an input device 210.

The processing unit 202 represents any suitable processing device(s), such as a microprocessor, microcontroller, digital signal processor, application-specific integrated circuit, field programmable gate array, or other logic device. The memory unit 204 represents any suitable volatile and/or non-volatile storage and retrieval device(s), such as random access or read-only memory.

The interface 206 represents any suitable interface for facilitating communication over one or more networks, such as an Ethernet interface or other electrical signal line interface or a wireless interface. For example, the interface 206 can be used to receive instructions for controlling operations of the thermal management system from other controllers, such as a satellite controller that controls the overall operation of the sensor 100. The display 208 represents any suitable display device for presenting information to a user. The input device 210 represents any suitable device(s) for receiving input from a user, such as a keyboard or mouse. For example, the input device 210 may be used to provide user input that directs the operation of the thermal management system by a user.

In FIG. 2, the memory unit 204 includes at least one executable application 212. The application 212 represents one or more computer programs defining how the controller 200 controls operation of the thermal management system. For example, the application 212 may receive signals representing temperature measurements of certain thermally sensitive components 103 of the infrared system and adjust the orientation of the sensor 100 according to these received measurements. This adjustment could be performed on a one time basis or on a continual, on-going basis. The application 212 could also include instructions for other features, such as generating an alarm if the measured temperatures of thermally sensitive components 103 of the sensor 100 falls outside of their expected limits.

Although FIG. 2 illustrates one example of a controller 200 for controlling operation of the thermal management system, various changes may be made to FIG. 2. The controller 200 could include fewer or additional components according to particular needs. For example, the display 208 and/or input device 210 may be excluded if a user interface is not needed or desired. As another example, the memory unit 204 and/or the executable application 212 may be excluded if the processing unit 202 includes logic circuitry, such as a field programmable gate array (FPGA) or application specific integrated circuit (ASIC). In addition, the controller 200 could be used to control one or multiple thermal management systems.

Figure 3:
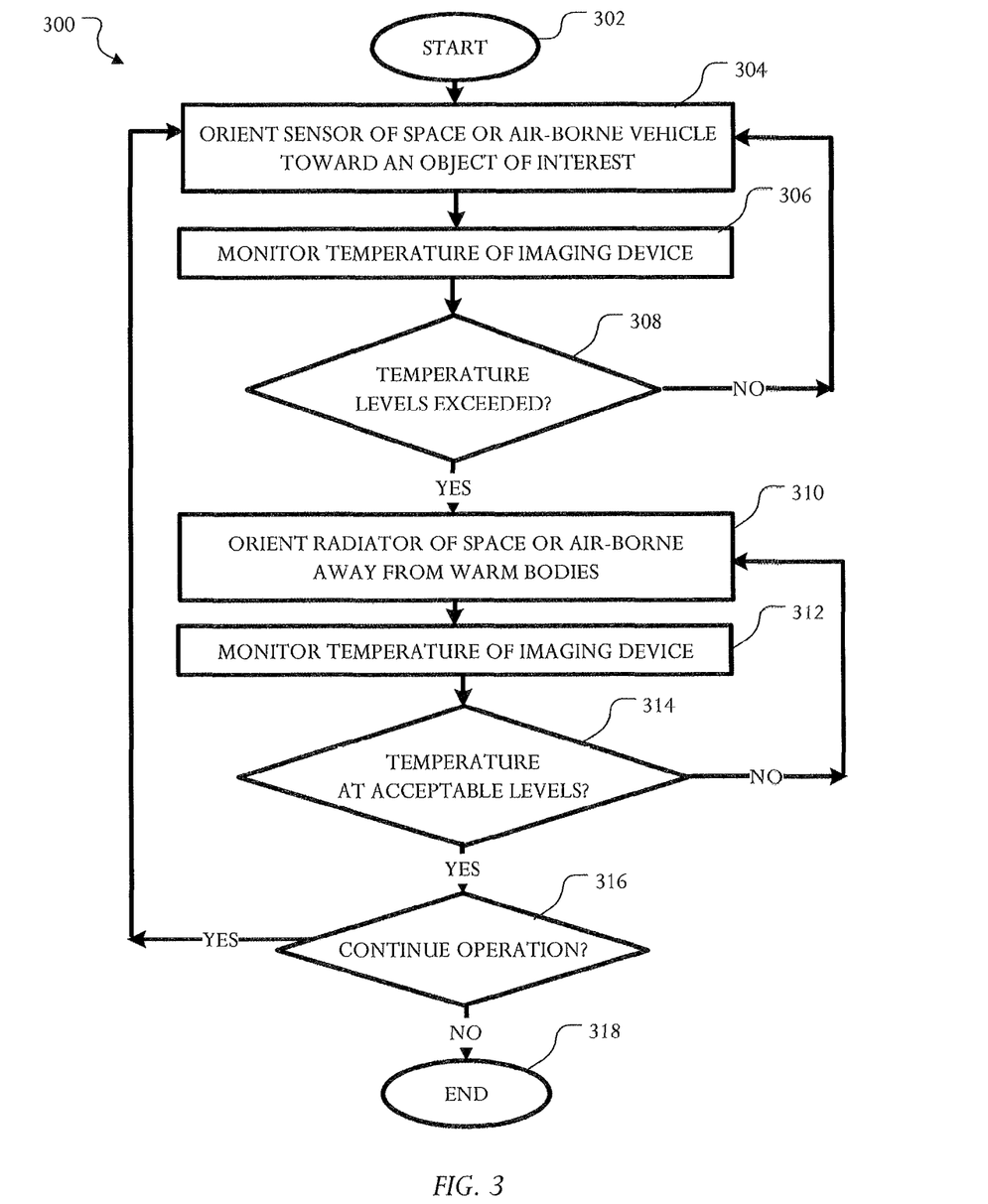
FIG. 3 illustrates an example process that may be performed by the thermal management system of FIGS. 1A-1D to manage temperature levels of one or more sensors according to this disclosure.

FIG. 3 illustrates an example process that may be performed by the thermal management system of FIGS. 1A-1D to manage temperature levels of one or more sensors 104, such as one or more infrared sensors. At step 302, the process is initiated. Initially, it is assumed that the components 103 of the infrared sensor are at temperature levels suitable for acquisition of imagery.

At step 304, the controller 200 orients the sensor 100 of the space or air-borne vehicle 102 toward a desired object or region of interest. In particular configurations, the sensor 100 may be positioned as shown in FIGS. 1B and 1D. For example, the gimbal may be oriented such that the input of the sensor 100 is oriented toward a region of Earth that is of interest to its user. Other examples of objects of interest may include the Sun, the Moon, other planets, and a Base Station. At this time, the sensor 100 may begin acquisition of information provided by the infrared sensor 100.

At step 306, the controller 200 monitors the temperature level of thermally sensitive components 103 of the sensor 100. The desired orientation of the sensor 100 may also cause the radiator 112 to at least partially face toward other warm bodies such as the Earth, Moon, or Sun. The radiator 112 may cease dissipating thermal energy from the component 108 or may not dissipate thermal energy at a sufficient rate to maintain desired temperature levels of the thermally sensitive components 103 of the sensor 100.

At step 308, the controller 200 determines whether the temperature levels of the thermally sensitive components 103 of the sensor 100 have exceeded acceptable levels. If not, the controller 200 continues operation at step 304 in which the sensor 100 is oriented towards the region of interest. However, if the temperature levels of the thermally sensitive components 103 of the infrared sensor 100 have exceed acceptable levels, processing continues at step 310.

At step 310, the controller 200 orients the radiator 310 of sensor 100 away from warm bodies such as towards deep space. In particular configurations, the sensor 100 may be positioned as shown in FIGS. 1A and 1C. In this disclosure, deep space generally refers to a region of space not having any or relatively few warm bodies, such as the Earth, Moon, or Sun within the sensor's field-of-view. In this orientation, the radiator 112 may dissipate thermal energy for cooling of the component 108.

At step 312, the controller 200 again monitors the temperature level of thermally sensitive components 103 of the sensor 100.

At step 314, the controller 200 determines whether the temperature levels of the thermally sensitive components 103 of the sensor 100 are again at acceptable levels. If not, processing continues at step 310 in which the sensor 100 is oriented away from any warm bodies for continued cooling of the component 108 and consequently the thermally sensitive components 103 of the sensor 100. However, if the temperature levels of the thermally sensitive components 103 of the sensor 100 are again at acceptable levels, processing continues at step 316.

At step 316, the controller 200 determines whether continued use of the thermal management system is desired. In certain embodiments, the controller 200 may determine whether continued use of the thermal management system is desired via user input through input device 210. In other embodiments, the determination of continued use may be provided by any suitable means. For example, the controller 200 may determine that a fault condition of the infrared sensor 100 exists such that continued operation may cause damage to the infrared sensor 100. Thus, in this case, the controller 200 may automatically determine that continued use of the thermal management system is no longer desired.

If continued use of the thermal management system is desired, processing continues at step 304 in which the sensor 100 is again oriented toward the desired region of interest. However, if continued use of the thermal management system is no longer desired, processing ends at step 318.

Although FIG. 3 illustrates one example of a method 300 for controlling the thermal management system, various changes may be made to FIG. 3. For example, while shown as a series of steps, various steps in FIG. 3 could overlap, occur in parallel, occur in a different order, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrase "associated with" and its derivatives mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "receive" and its derivatives include receipt from an external source or an internal source.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   an optical sensor comprising one or more thermally sensitive components, the optical sensor configured to be mounted to a space or air-borne vehicle via a gimbal, the optical sensor including a heat sink component thermally coupled to the one or more thermally sensitive components via at least one heat strap, the heat sink component configured to passively receive and store thermal energy from the one or more thermally sensitive components through the at least one heat strap without use of a motorized thermal energy transfer device; and
   a radiator configured to dissipate the thermal energy to an ambient environment, the radiator disposed on a first side of an optical path of the optical sensor opposite a second side of the optical path on which the heat sink component is disposed such that the heat sink component at least partially balances a center-of-gravity of the optical sensor with respect to the gimbal;
   wherein the heat sink component is thermally coupled between the radiator and the one or more thermally sensitive components, and wherein the radiator is configured to receive the thermal energy from the heat sink component.

2. The apparatus of claim 1, further comprising a one-way heat transfer device thermally coupled between the heat sink component and the radiator, the one-way heat transfer device configured to:
   allow a movement of the thermal energy in a first direction from the heat sink component to the radiator, and
   limit a movement of the thermal energy in a second direction from the radiator to the heat sink component.

3. The apparatus of claim 2, wherein the one-way heat transfer device comprises at least one of (i) a thermal switch or (ii) a heat pipe having a wick that is configured to move multi-phase refrigerant in liquid form.

4. The apparatus of claim 1, wherein the radiator comprises a cryoradiator.

5. The apparatus of claim 1, wherein the optical sensor comprises an infrared device.

6. The apparatus of claim 1, wherein the radiator has a front surface configured to radiate the thermal energy, and wherein the apparatus is configured to:
   orient the optical sensor such that the front surface of the radiator points away from one or more warm bodies to cool the heat sink component; and
   orient the optical sensor such that the optical sensor points toward an object of interest to acquire information about the object, the heat sink component configured to cool the one or more thermally sensitive components while the sensor is pointed at the object of interest.

7. A non-transitory computer readable medium embodying a computer program, the computer program comprising computer readable program code for:
   orienting a front surface of a radiator to point away from one or more warm bodies to dissipate thermal energy from a heat sink component of an optical sensor, the heat sink component thermally coupled to one or more thermally sensitive components of the optical sensor via at least one heat strap, the optical sensor being mounted to a space or air-borne vehicle via a gimbal, the radiator disposed on a first side of an optical path of the optical sensor opposite a second side of the optical path on which the heat sink component is disposed such that the heat sink component at least partially balances a center-of-gravity of the optical sensor with respect to the gimbal; and
   orienting the optical sensor toward an object of interest to acquire information about the object, wherein the heat sink component is configured to passively receive the thermal energy from the one or more thermally sensitive components through the at least one heat strap without use of a motorized thermal energy transfer device while the optical sensor is oriented toward the object of interest.

8. The non-transitory computer readable medium of claim 7, wherein the optical sensor comprises a one-way heat transfer device thermally coupled between the heat sink component and the radiator.

9. The non-transitory computer readable medium of claim 8, wherein the one-way heat transfer device comprises at least one of (i) a thermal switch or (ii) a heat pipe having a wick that is configured to move multi-phase refrigerant in liquid form.

10. The non-transitory computer readable medium of claim 7, wherein the radiator comprises a cryoradiator.

11. The non-transitory computer readable medium of claim 7, wherein the optical sensor comprises an infrared device.

12. The non-transitory computer readable medium of claim 7, wherein the heat sink component comprises a phase change material.

13. A thermal management system comprising:
   an optical sensor configured to be mounted to a space or air-borne vehicle via a gimbal, the optical sensor comprising a heat sink component configured to passively receive and store thermal energy from one or more thermally sensitive components through at least one heat strap without use of a motorized thermal energy transfer device, the at least one heat strap thermally coupling the heat sink component to the one or more thermally sensitive components, the optical sensor comprising the one or more thermally sensitive components;
   a radiator configured to dissipate the thermal energy to an ambient environment, the radiator disposed on a first side of an optical path of the optical sensor opposite a second side of the optical path on which the heat sink component is disposed such that the heat sink component at least partially balances a center-of-gravity of the optical sensor with respect to the gimbal; and a controller configured to:
orient a front surface of the radiator away from one or more warm bodies to cool the heat sink component, the radiator configured to dissipate the thermal energy; and
orient the optical sensor toward an object of interest to acquire information about the object, the heat sink component configured to cool the one or more thermally sensitive components while the optical sensor is oriented at the object of interest.

14. The thermal management system of claim 13, wherein the heat sink component comprises a phase change material.

15. The thermal management system of claim 13, further comprising a one-way heat transfer device thermally coupled between the heat sink component and the radiator, the one-way heat transfer device configured to:
allow a movement of the thermal energy in a first direction from the heat sink component to the radiator, and
limit a movement of the thermal energy in a second direction from the radiator to the heat sink component.

16. The thermal management system of claim 15, wherein the one-way heat transfer device comprises at least one of (i) a thermal switch or (ii) a heat pipe having a wick that is configured to move multi-phase refrigerant in liquid form.

17. The thermal management system of claim 13, wherein the radiator comprises a cryoradiator.

18. The thermal management system of claim 13, wherein the optical sensor comprises an infrared device.

19. The apparatus of claim 1, wherein the heat sink component uses no power source to passively receive the thermal energy from the one or more thermally sensitive components.

20. The thermal management system of claim 13, wherein the heat sink component uses no power source to passively receive the thermal energy from the one or more thermally sensitive components.

* * * * *